Feb. 11, 1969  E. W. ANDERSON  3,426,431
NAVIGATION APPARATUS FOR VEHICLES
Filed Oct. 27, 1966  Sheet 1 of 3

EDWARD WILLIAM ANDERSON
— Inventor

Moore and Hall
— Attorneys

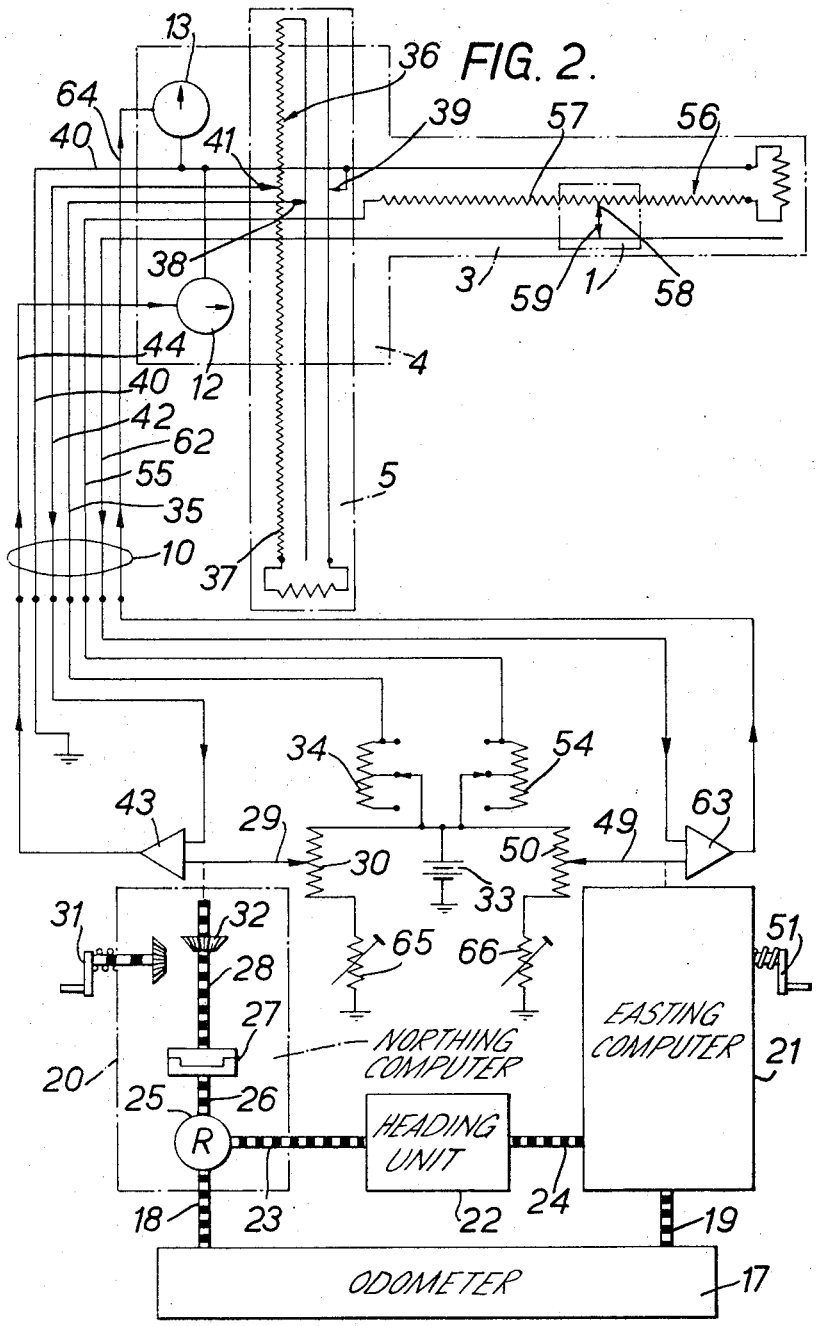

Feb. 11, 1969 E. W. ANDERSON 3,426,431
NAVIGATION APPARATUS FOR VEHICLES
Filed Oct. 27, 1966 Sheet 3 of 3
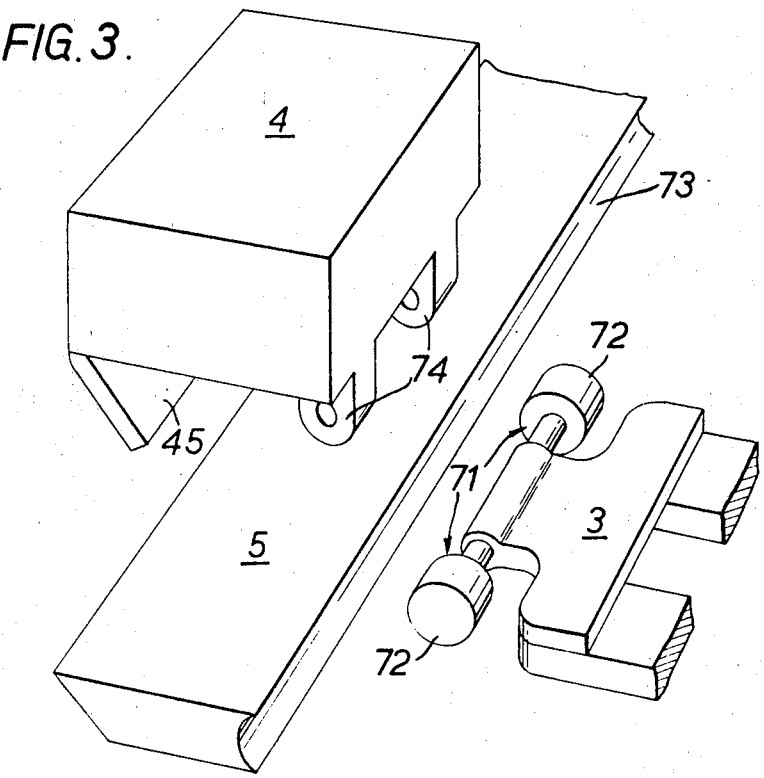
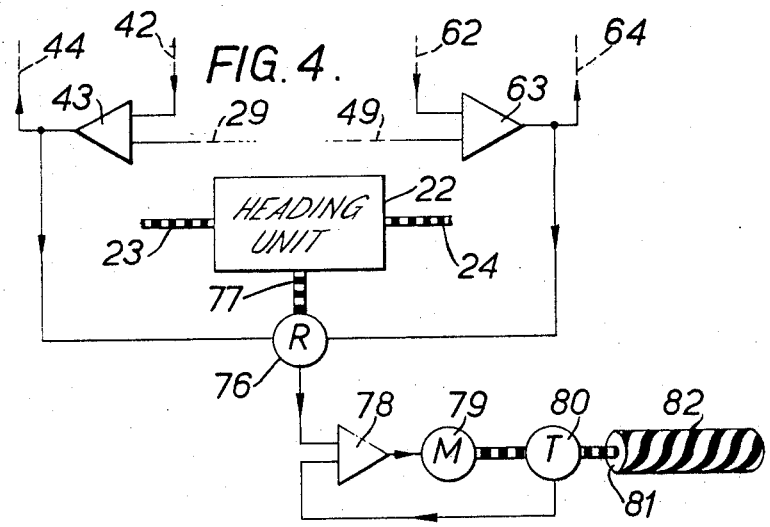
EDWARD WILLIAM ANDERSON
— Inventor
Moore and Hall - Attorneys United States Patent Office
3,426,431
Patented Feb. 11, 1969

3,426,431
NAVIGATION APPARATUS FOR VEHICLES
Edward William Anderson, Charlton Kings, Cheltenham, England, assignor to Smiths Industries Limited, London, England, a British company
Filed Oct. 27, 1966, Ser. No. 590,014
Claims priority, application Great Britain, Nov. 2, 1965, 46,475/65
U.S. Cl. 33—1                                9 Claims
Int. Cl. G01c 21/20

ABSTRACT OF THE DISCLOSURE

Vehicle-navigation apparatus includes a map-board providing signals representing map-coordinates of a cursor moveable across the board, and dead-reckoning equipment providing signals representing the corresponding coordinates of vehicle-position. Center-zero indicators mounted on the cursor slide-bar of the map-board display coordinate-differences obtained from comparison of the two sets of signals. Display of required change in vehicle-heading is computed from the coordinate differences and actual heading angle.

---

Navigation of a military land-vehicle is conventionally carried out using dead-reckoning navigation equipment that provides numerical representations of position in the form of grid-coordinates of northing and easting. However, it has been recognised that it would be desirable to provide in addition to these numerical representations a pictorial presentation of position, since this could be more readily assimilated and would be less liable to misinterpretation in such circumstances as those occuring on a battlefield.

Previously, pictorial presentations of position have consisted either of optically-projected moving maps, or of cross-pointers moving over fixed maps, or of combinations of these two systems (such as, for example, pens moving across roller strip maps). Such arrangements tend to be bulky and complex and to add substantially to the cost of the normal dead-reckoning equipment. More important than this, such devices demand the use of special maps which may not be readily available as required, and this problem tends to reduce flexibility.

It is an object of the present invention to provide navigation apparatus that may be used to overcome these disadvantages.

According to the present invention navigation apparatus for a vehicle, comprises means defining a map-display area, a position-indicating device moveable across said area in each of two coordinate-directions for indicating a selected position on the map-display, means for providing representations of coordinates of the indicated position in accordance with the position of the position-indicating device, means for deriving in accordance with the position of the vehicle representations of coordinates of the vehicle-position, and means arranged to respond to the coordinate-representations of indicated-position and vehicle-position for providing indication dependent upon any difference between the indicated and vehicle positions.

The said indication may be provided by two indicating devices, one of the two indicating devices being arranged to provide an indication in magnitude and sense of any difference between the indicated and vehicle positions in a first of the two coordinate-directions, and the other indicating device being arranged to provide a corresponding indication of any difference between the indicated and vehicle positions in the second of the two coordinate-directions. The two indicating devices may be central-zero electrical meters.

The navigation apparatus may include means for deriving in accordance with the heading of the vehicle and the coordinate-representations of indicated-position and vehicle-position a heading-error signal, the heading-error signal being representative of the change in heading of the vehicle that is required for reducing said difference between indicated and vehicle positions towards zero. An indication of the heading-error may be provided using indicator means of the general kind described in British patent specification No. 853,034, and may be specifically as described in British patent specification No. 886,136. In this latter respect, the indicator means may comprise a rotatable cylindrical member carrying an optically-distinct helical band coaxial therewith, and means responsive to the heading-error signal for rotating the cylindrical member at a rate and in a sense dependent upon the magnitude and sense of said required change of heading.

According to a feature of the present invention, navigation apparatus for a vehicle comprises a rectangular map-display area, an elongated track extending lengthwise along one side of the map-display area, an elongated cross-bar mounted on the track to extend at right-angles to the track across the map-display area, the cross-bar being mounted on the track for transverse movement lengthwise of the track, a cursor carried by the cross-bar for indicating position on the map-display, said cursor being mounted on the cross-bar for movement lengthwise of the cross-bar, means for providing a representation of the displacement of the cross-bar along the track, means for providing a representation of the displacement of the cursor along the cross-bar, vehicle-navigation equipment for providing representations of first and second coordinates of the position of the vehicle, comparator means for comparing the representation of displacement of the cross-bar along the track with the representation of the said first coordinate of vehicle-position to derive a first signal representative of any difference measured parallel to said track between said indicated-position and the vehicle-position on said map-display, comparator means for comparing the representation of displacement of the cursor along the cross-bar with the second coordinate of vehicle-position to derive a second signal representative of any difference measured parallel to said cross-bar between said indicated-position and the vehicle-position on said map-display, and two indicating devices for providing respectively indications of said two differences in accordance with the first and second signals.

Navigation apparatus in accordance with the present invention and for use in a military land-vehicle, will now be described, by way of example, with reference to the accompanying drawings in which:

FIGURE 2 shows the electrical circuit of the navigation apparatus;

FIGURE 3 illustrates constructional details of part of the map-board assembly; and FIGURE 4 is a circuit diagram illustrating a modification of the navigation apparatus of FIGURES 1 and 2.

Figure 1:
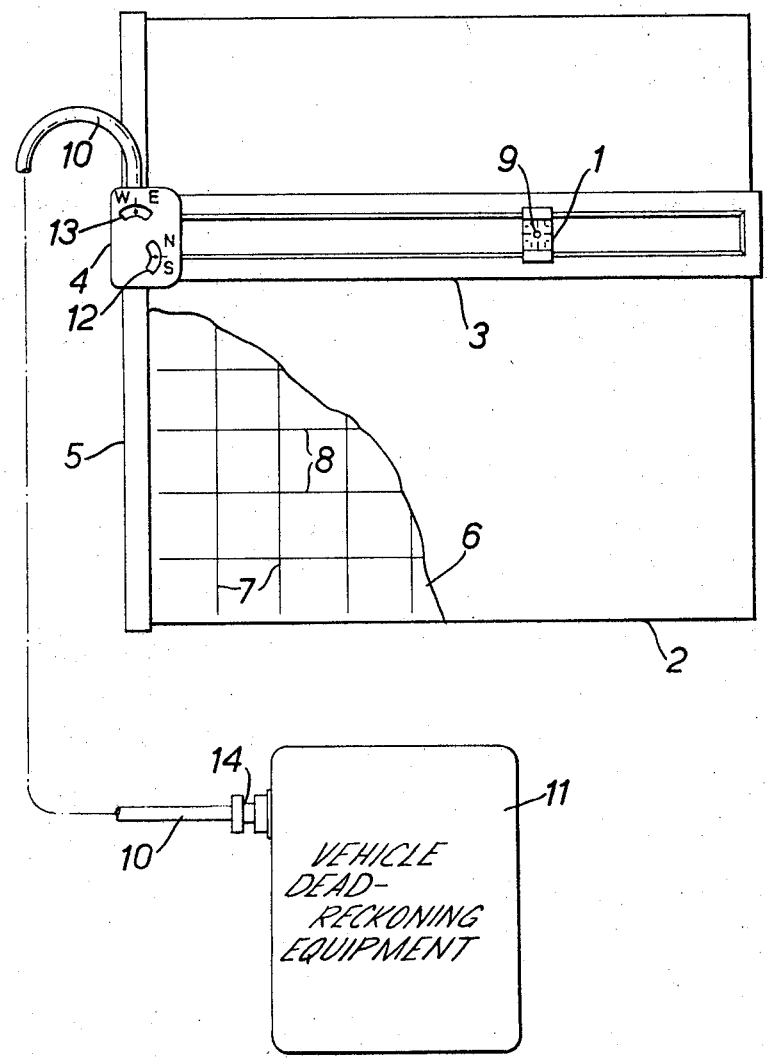
FIGURE 1 shows a map-board assembly as associated in the navigation apparatus with dead-reckoning navigation equipment of the vehicle.

Referring to FIGURE 1, a transparent cursor 1 is mounted for movement over the surface of a square map-board 2. More specifically, the cursor 1 is carried by, and is moveable along the length of, a transparent cross-bar 3 that extends across the width of the map-board 2 and generally parallel to the top and bottom edges. The cross-bar 3 is itself carried by a slider 4 that is mounted for movement along the length of an elongated track 5, the track 5 being clipped to the map-board 2 along one of the side edges of the board 2. The cross-bar 3, which extends across the map-board 2 at right-angles to the track 5, is hinged to the slider 4 so that it may be lifted up from the surface of the map-board 2 to allow clear access to a map 6 (shown in part only) carried beneath it on the map-board 2. The map 6 is placed on the map-board 2 with the north-south grid lines 7 of the map 6 parallel to the track 5 and thereby with the east-west grid lines 8 of the map 6 parallel to the cross-bar 3. The position indicated on the map 6 by a small centrally-positioned aperture 9 in the cursor 1 can accordingly be changed in grid-northing by displacement of the slider 4 (and with it the cross-bar 3) along the track 5, and can be changed in grid-easting by displacement of the cursor 1 along the cross-bar 3.

As described in greater detail below, two electric signals dependent respectively upon the setting of the slider 4 along the track 5 and the setting of the cursor 1 along the cross-bar 3 are conveyed via a multi-lead cable 10 to dead-reckoning navigation equipment 11 of the vehicle. In the equipment 11 these signals are used to derive two further electric signals that are representative respectively of the extent in grid-northing and the extent in grid-easting by which the position indicated on the map 6 by the aperture 9, differs from the actual position of the vehicle. These difference signals are conveyed to the slider 4 via the cable 10, and are there supplied to indicating devices 12 and 13 respectively, mounted on the slider 4. The indicating device 12 is supplied with the signal representative of the difference in grid-northing, and in accordance therewith provides an indication of the magnitude and sense of movement of the slider 4 along the track 5 required to reduce the difference to zero. The indicator 13, on the other hand, is supplied with the signal representative of the difference in grid-easting, and in accordance therewith provides an indication of the magnitude and sense of movement of the cursor 1 along the cross-bar 3 required to reduce this difference to zero.

The navigation equipment 11 of the vehicle provides measures of the grid-northing and grid-easting of the vehicle with respect to some predetermined, and selectively-variable, datum position, the measure in each case being in the form of an electric signal. The circuit arrangement of the equipment 11 together with that of the map-board assembly will now be described with reference to FIGURE 2.

Referring to FIGURE 2, an odometer 17 rotates two shafts 18 and 19 in accordance with the distance travelled by the vehicle, the odometer 17 deriving a measure of distance-travelled in accordance with the number of revolutions of wheels of the vehicle and rotating each shaft 18 and 19 to a rotational position dependent upon this measure. The representation of distance-travelled is applied via the shaft 18 to a northing computer 20 and via the shaft 19 to an easting computer 21. The computers 20 and 21 compute respectively the grid-northing and grid-easting of the vehicle, from the representation of distance-travelled and also from a representation of heading-angle of the vehicle provided by a heading unit 22. The heading-angle in this connection is a measure of the heading of the vehicle with respect to grid-north, and is represented to the computers 20 and 21 by the rotational positions of shafts 23 and 24 respectively, that are driven by a compass servo-system in the heading unit 22.

Within the northing computer 20, the representation of distance-travelled provided by the shaft 18 is applied to a resolver 25 to be resolved through the heading-angle represented by the shaft 23. The output from the resolver 25, as this is represented by the rotational position of a shaft 26, accordingly provides a measure of the distance travelled in the north-south direction. The shaft 26 is coupled through a clutch 27 to drive a shaft 28 and thereby position a potentiometer tap 29 on a potentiometer resistance 30.

The rotational position of the shaft 28, and thereby the position of the tap 29 on the resistance 30, is manually-adjustable by means of a rotatable handle 31 that may be selectively engaged to drive a bevel gear 32 on the shaft 28. The clutch 27, which is of the slipping kind allowing drive therethrough in one direction only, acts to prevent any rotation of the shaft 28 by means of the handle 31 being conveyed back to the shaft 26 and thence to the odometer 17. Thus the setting of the tap 29 on the resistance 30 provides a measure of the grid-northing of the vehicle with respect to a datum vehicle-position determined in the north-south direction by rotation of the handle 31 of the computer 20. The handle 31 is spring-biased out of driving-engagement with the gear 32 so as to minimize the likelihood that the datum vehicle-position can be inadvertently altered during the course of a journey.

The potentiometer resistance 30 is supplied with electric current from a battery 33 that also serves to supply electric current via an adjustable resistance 34, and thence via a lead 35 of the cable 10, to a potentiometer 36 in the map-board assembly. The resistance wire 37 of the potentiometer 36 extends the length of the track 5, connection with it being made to one end from the lead 35 via a tap 38, and from the other end via a tap 39 to a common ground-return lead 40 of the cable 10. The taps 38 and 39 are carried in the slider 4 together with a tap 41 of the potentiometer 36, the tap 41 being positioned along the wire 37 in accordance with the displacement of the slider 4 along the track 5. This displacement corresponds to the grid-northing measured with respect to some predetermined datum map-position) of the position indicated on the map 6 by the aperture 9, and the signal derived at the tap 41 is supplied via a lead 42 of the cable 10 to a differential amplifier 43 in the navigation equipment 11. The differential amplifier 43 compares this signal with the signal derived by the potentiometer tap 29, and the resulting output signal of the amplifier 43 is supplied via a lead 44 of the cable 10 to the indicating device 12 on the slider 4. The device 12 in accordance with this output signal provides an indication, in magnitude and sense, of any difference between the two signals supplied to the amplifier 43.

The easting-computer 21 is of the same general form as the northing-computer 20. In this case, however, the resolution of distance-travelled (represented by the shaft 19) is made through the complement of the heading-angle (represented by the shaft 24), and the computer 21 sets the tap 49 of a resistance 50 in accordance with a measure of the grid-easting of the vehicle with respect to the datum vehicle-position; the datum vehicle-position is adjustable in the east-west direction by engagement and rotation of a manually-rotatable handle 51 of the computer 21.

The resistance 50 is supplied with electric current from the battery 33, and the battery 33 also supplies electric current via an adjustable resistance 54, and thence via a lead 55 of the cable 10, to a potentiometer 56 in the map-board assembly. The resistance wire 57 of the potentiometer 56 extends the length of the cross-bar 3, a tap 58 of the potentiometer 56 being carried by the cursor 1 to be positioned along the wire 57 in accordance with the displacement of the cursor 1 along the cross-bar 3. This displacement corresponds to the grid-easting (measured with respect to the predetermined datum map-position) of the position indicated on the map 6 by the aperture 9, and the signal derived at the tap 58 is supplied via a tap 59, also carried by the cursor 1, to a lead 62 of the cable 10. From the lead 62 the signal is supplied to a differential amplifier 63 to be compared with the signal derived by the potentiometer tap 49. The resulting output signal of the amplifier 63 is supplied via a lead 64 of the cable 10 to the indicating device 13 on the slider 4. The device 13 in accordance with this signal provides an indication, in magnitude and sense, of any difference between the two signals supplied to the amplifier 63.

The resistances 34 and 54 connected in series with the leads 35 and 55 are adjustable in order to allow a message of compensation for minor inaccuracies in the balancing of the system. Variable resistors 65 and 66 are connected in series with the potentiometer resistances 30 and 50 for the same reason.

Before operation of the apparatus the navigator makes whatever adjustments are necessary to ensure that the datum vehicle-position is the same as the datum map-position. This is achieved simply by ascertaining the exact position of the vehicle at the start of a journey, placing the aperture 9 on the corresponding position on the map 6, and then engaging and rotating the handles 31 and 51 to the extent necessary to bring both indicating devices 12 and 13 to zero-indication. During the journey (and when, for example, the map 6 is changed for another) the navigator, after obtaining a fix of the vehicle-position, can readily ensure that the navigation equipment 11 and the map-board assembly continue to work to the same datum by effecting the same simple adjustment-procedure.

Throughout the journey the indicating devices 12 and 13 indicate the extent in magnitude and sense by which the vehicle-position differs from the position indicated by the aperture 9 on the map 6, the device 12 indicating the difference in grid-northing and the indicating device 13 the difference in grid-easting. Simply by moving the cursor 1 to position the aperture 9 on any selected map-position, the navigator can obtain indication of the grid-northing and grid-easting of that selected position from the vehicle.

Although the apparatus can be used to determine the position of the vehicle by moving the cursor 1 until both indicating devices 12 and 13 provide zero indication, the apparatus is preferably used for homing purposes, the cursor 1 being set to position the aperture 9 at a desired turning-point or land-mark on the desired course of the vehicle, and the progress of the vehicle towards this being checked by observation of the indicating devices 12 and 13. The cursor 1 may have a central transparent area that corresponds to each square of the grid system and, as shown in FIGURE 1, is preferably provided with vernier markings to assist the navigator to move it to an exact position within the grip and to read position on the map 6 precisely. In order to assist with the exact positioning of the cursor 1, cross-wires or pointer-indices may be provided on the cursor 1 in addition, or alternatively, to the central aperture 9.

The apparatus described above has the particular advantages of simplicity and cheapness. It does not involve the use of a special map and does not restrict the navigator's ability to annotate the map and plot the desired course; in fact the map 6 and map-board 2 may be of the standard form normally provided within the vehicle, the only restriction imposed being the necessity to connect the cable 10 to the navigation equipment 11 of the vehicle. Connection of the cable 10 to the navigation equipment 11 may be made, as shown in FIGURE 1, via a releasable plug-and-socket connector 14 that will allow the map-board 2, and with it the track 5 and slider 4, to be removed from the vehicle. Furthermore, there is the advantage that in the event of malfunction of the apparatus through any cause; the navigator can himself proceed with dead-reckoning navigation of the vehicle without trouble using the map 6, and the information on it, in the usual way. The cross-bar 3 can easily be removed from the surface of the map-board 2 so as to allow full access to the map 6, but even this does not result in loss of information.

The cross-bar 3, which is hinged to the slider 4 so that it can be raised from the map-board 2, is required to be maintained normal to the track 5 and yet should be resiliently mounted in order to reduce damage from any force applied to the free end of the cross-bar 3. An example of the manner in which the cross-bar 3 may be mounted in this respect is shown in FIGURE 3.

Referring to FIGURE 3, the cross-bar 3 at its end adjacent the track 5 carries a transverse hinge pin 71 having enlarged and removable bosses 72 at either end for sliding in a groove 73 along the inner edge of the track 5. The hinge pin 71 in the assembly extends through two drilled lugs 74 carried by the slider 4, the pin 71 being a loose fit within the lugs 74 and being retained by the bosses 72 at either end. A spring 45 carried by the slider 4 presses against the outer edge of the track 5 urging the lugs 74 positively against the hinge pin 71 so as to hold the bosses 72 firmly in the groove 73. The slider 4 and cross-bar 3 are thereby held firmly but resiliently in alignment with the track 5.

Directions to the driver of the vehicle when the navigation apparatus is being used for homing purposes may be derived from the difference-signals that are supplied to the two indicating devices 12 and 13. These signals, representing the required northing and easting, may be modified in accordance with the heading of the vehicle and used to produce indication of the need to turn left or right. An example of the manner in which this may be effected will now be described with reference to FIGURE 4.

Referring to FIGURE 4, the output signals of the differential amplifiers 43 and 63, representing the northing and easting components of the desired heading of the vehicle, are supplied to a resolver 76. The resolver 76 acts to compare the represented desired-heading with the actual heading of the vehicle. The actual heading is represented to the resolver 76 by the rotational position of a shaft 77 that is driven by the heading unit 22, and the resolver 76 supplies to a servo amplifier 78 an output signal representative in magnitude and sense of the heading error. The output signal of the amplifier 78 energizes a servo motor 79 to drive, in addition to a tachometer generator 80, a cylindrical member 81 that is mounted for rotation about its longitudinal axis. The tachometer generator 80 supplies to the amplifier 78, as degenerative feedback, a signal representative of the rate of rotation of the member 81, with the result that the motor 79 is energized to rotate the member 81 at a rate and in a sense dependent respectively upon the magnitude and sense of the error signal supplied by the resolver 76.

The cylindrical member 81 carries on its surface an optically-distinct helical band 82 coaxial therewith (so that the member 81 is comparable in appearance with a "barber's pole"). The cylindrical member 81 is preferably positioned below the line-of-sight of the driver just within his field of view and with its longitudinal axis horizontal and normal to the line-of-sight, the cylindrical member 81 being driven in accordance with the error signal to rotate at a rate dependent upon the extent to which the vehicle is to be turned, and in one sense or the other in dependence upon whether the turn is to be to the left or right. The helical band 82 on the rotated member 81 gives an optical effect of linear movement at a rate and in the sense appropriate to the turn to be made; the driver responds to this to turn the vehicle as required to bring the member 81 to the stationary state and thereby reduce the error signal to zero.

It may be found advantageous to arrange that warning is given (for example, by means of flashing lights) in the event that either of the potentiometer taps 29 or 49 is driven to the end of its available travel. There is no likelihood of damage to the dead-reckoning equipment 11 in either of these circumstances owing to the provision of the slipping clutches (such as the clutch 27), but there is a potential loss of the record of position.

Although central-zero indicating devices 12 and 13, specifically electrical meters, are used in the arrangement described above, other forms of indicating device may be used. Central-zero meters have the advantage that the movements of their pointers may be made to correspond with the required movements of the position indicated on the map. Nevertheless, lamps may be used, and these would be extremely cheap and robust. The indicating devices need not, of course, be carried by the slider 4, but may be mounted if desired on the normal instrument panel of the vehicle.

Small motors could be fitted to drive the slider 4 along the track 5 and the cursor 1 along the cross-bar 3, and thus to assist the navigator in cancelling the northing- and easting-errors. In any case, it will be desirable for the differential amplifiers 43 and 63 to be non-linear differential amplifiers otherwise the signalling of northing- and easting-error will either be too insensitive, or else will be liable to gross overload when these errors are large.

By way of simplification of the apparatus described above with reference to FIGURES 1 and 2, the tap 29 may be connected directly via the lead 44 of the cable 10 to one side of the indicator 12, and the tap 41 directly to the other side, the differential amplifier 43 and the lead 42 being in this case omitted. Similarly, the tap 49 may be connected directly via the lead 64 of the cable 10 to one side of the indicator 13 and the tap 58 via the tap 59 to the other side, the differential amplifier 63 and the lead 62 being omitted. With this simplified form of the apparatus, the signals at the taps 41 and 58 representing the indicated-position, are balanced respectively and directly against the signals at the taps 29 and 49 representing the vehicle-position, any unbalance between the compared signals in either case resulting in current flow through the relevant indicator 12 or 13. The magnitude and sense of current flow is dependent upon the extent and sense of the unbalance, and the indicators 12 and 13 accordingly act, as before, to indicate any difference between the indicated and vehicle positions.

I claim:

1. Navigation apparatus for a vehicle, comprising means defining a map-display area, a position-indicating device moveable across said area in each of two coordinate-directions for indicating a selected position on the map-display, means responsive to the position of the position-indicating device in said map-display area for providing representations of coordinates of the indicated position, means for deriving in accordance with the position of the vehicle representations of coordinates of the vehicle-position, first indicating means for comparing a first of the two coordinate-representations of indicated-position with a first of the two coordinate-representations of vehicle-position to provide a visual representation of the magnitude and sense of any difference between the indicated and vehicle positions in a first of said two coordinate-directions, and second indicating means for comparing the second of the two coordinate-representations of indicated-position with a second of the two coordinate-representations of vehicle-position to provide a visual representation of the magnitude and sense of any difference between the indicated and vehicle positions in the second of said two coordinate-directions.

2. Navigation apparatus according to claim 1 wherein said means defining a map-display area includes an elongated track, and an elongated cross-bar mounted on the track to extend at right-angles to the track, the cross-bar being mounted on the track for transverse movement lengthwise of the track, and wherein said position-indicating device is a cursor mounted on the cross-bar for movement lengthwise of the cross-bar.

3. Navigation apparatus according to claim 2 including a slider mounted on the track for sliding movement therealong, and wherein the cross-bar is hinged to the slider.

4. Navigation apparatus according to claim 2 wherein said means for providing representations of coordinates of said indicated-position includes a first potentiometer for deriving an electric signal dependent upon a first coordinate of the position indicated by the cursor, said first potentiometer having an elongated resistance element carried by the track to extend lengthwise thereof, and a tap element carried with the cross-bar to make contact with the resistance element at a point dependent upon the displacement of the cross-bar along the track, and a second potentiometer for deriving an electric signal dependent upon a second coordinate of the indicated position, said second potentiometer having an elongated resistance element carried by said cross-bar to extend lengthwise thereof, and a tap element carried with the cursor to make contact with the resistance element of the second potentiometer at a point dependent upon the displacement of the cursor along the cross-bar.

5. Navigation apparatus according to claim 1 wherein said first indicating means comprises a comparator for comparing said first coordinate-representation of indicated-position with said first coordinate-representation of vehicle-position to provide a first electric signal representative of the magnitude and sense of any difference between the indicated and vehicle positions in said first coordinate-direction, and a first electrical indicator responsive to said first electric signal for providing visual representation in magnitude and sense of the difference represented by said first signal, and wherein said second indicating means comprises a comparator for comparing said second coordinate-representation of indicated-position with said second coordinate-representation of vehicle-position to provide a second electric signal representative of the magnitude and sense of any difference between the indicated and vehicle positions in said second coordinate-direction, and a second electrical indicator responsive to said second electric signal for providing visual representation in magnitude and sense of the difference represented by said second signal.

6. Navigation apparatus according to claim 5 wherein said first and second indicators are both central-zero electrical meters.

7. Navigation apparatus according to claim 1 including means for providing a representation of the heading of the vehicle, means for deriving in accordance with the heading of the vehicle and the coordinate-representations of indicated-position and vehicle-position a heading-error signal, said heading-error signal being representative of the change in heading of the vehicle that is required for reducing said difference between indicated and vehicle positions towards zero, and indicator means responsive to the heading-error signal for providing an indication of the required change in heading.

8. Navigation apparatus according to claim 7 wherein said indicator means comprises a rotatable cylindrical member carrying an optically-distinct helical band coaxial therewith, and means responsive to said heading-error signal for rotating said cylindrical member at a rate and in a sense dependent upon the magnitude and sense of said required change of heading.

9. Navigation apparatus for a vehicle, comprising a rectangular map-display area, an elongated track extending lengthwise along one side of the map-display area, an elongated cross-bar mounted on the track to extend at right-angles to the track across the map-display area, the cross-bar being moveably mounted on the track for transverse movement lengthwise of the track, a cursor carried by the cross-bar for indicating position on the map-display, said cursor being moveably mounted on the cross-bar for movement lengthwise of the cross-bar, means for providing a representation of the displacement of the cross-bar along the track, means for providing a representation of the displacement of the cursor along the cross-bar, vehicle-navigation equipment for providing representations of first and second coordinates of position of the vehicle, comparator means for comparing the representation of displacement of the cross-bar along the track with the representation of the said first coordinate of vehicle-position to derive a first signal representative of any difference measured parallel to said track between said indicated-position and the vehicle-position on said map-display, comparator means for comparing the representation of displacement of the cursor along the cross-bar with the second coordinate of vehicle-position to derive a second signal representative of any difference measured parallel to said cross-bar between said indicated-position and the vehicle-position on said map-display, and two indicating devices responsive to the first and second signals respectively for providing indications of the two differences of position.

References Cited

UNITED STATES PATENTS

| | | | |
|---|---|---|---|
| 2,541,277 | 2/1951 | Omberg et al. | |
| 2,566,247 | 8/1951 | Pierce et al. | 33—1 |
| 2,692,377 | 10/1954 | Brettell | 33—1 |
| 2,718,061 | 9/1955 | Omberg et al. | 33—1 |
| 3,176,265 | 3/1965 | Schweighofer | 340—27 |

FOREIGN PATENTS 138,263   8/1950   Australia.

WILLIAM D. MARTIN, JR., *Primary Examiner.*

U.S. Cl. X.R.

33—141.5; 116—129; 340—27